US005535092A

United States Patent [19]

Bang

[11] Patent Number: 5,535,092
[45] Date of Patent: Jul. 9, 1996

[54] APPARATUS FOR REDUCING IMPACTS ON A HARD DISK ASSEMBLY

[75] Inventor: Kug-Hyeon Bang, Seoul, Rep. of Korea

[73] Assignee: SamSung Electronics Co., Ltd., Suwon, Rep. of Korea

[21] Appl. No.: 422,526

[22] Filed: Apr. 14, 1995

[30] Foreign Application Priority Data

Apr. 27, 1994 [KR] Rep. of Korea ............... 9021/1994

[51] Int. Cl.$^6$ ............................................. H05K 7/14
[52] U.S. Cl. ................................... 361/685; 248/634
[58] Field of Search .................................. 361/683, 685; 310/51, 112; 434/224; 446/140, 141; 248/634

[56] References Cited

U.S. PATENT DOCUMENTS

| | | |
|---|---|---|
| 4,683,520 | 7/1987 | Grassens et al. . |
| 4,705,257 | 11/1987 | Leo et al. . |
| 4,749,164 | 6/1988 | Leo et al. . |
| 4,908,715 | 3/1990 | Krum et al. . |
| 5,004,207 | 4/1991 | Ishikawa et al. ................. 248/632 |
| 5,223,996 | 6/1993 | Read et al. ....................... 360/97.02 |
| 5,333,098 | 7/1994 | DeLuca et al. . |
| 5,402,308 | 3/1995 | Koyanagi et al. . |

*Primary Examiner*—Leo P. Picard
*Assistant Examiner*—Jayprakash N. Gandhi
*Attorney, Agent, or Firm*—Robert E. Bushnell

[57] ABSTRACT

An apparatus for reducing impact upon a hard disk assembly in a hard disk drive includes: an upper frame, a lower frame, slots arcuately formed within corners of the upper frame and the lower frame, and elastic elements for buffering the hard disk assembly from impact. Each one of the elastic elements has a hole formed at a center portion and is inserted into the slots formed in the corners of the upper frame and the lower frame. Contact surfaces and arcuate recesses are provided at upper and lower portions of the corners of the hard disk assembly to accommodate installation of the elastic elements. A fastener attaches the elastic elements, the hard disk assembly, the upper frame and the lower frame together such that neither the upper frame nor the lower frame contacts the hard disk assembly.

16 Claims, 3 Drawing Sheets

APPARATUS FOR REDUCING IMPACTS ON A HARD DISK ASSEMBLY

CROSS-REFERENCE TO RELATED APPLICATIONS

This application makes reference to, incorporates the same herein, and claims all benefits incurring under 35 U.S.C. §119 from an application for *An Apparatus For Reducing An impact On A Hard Disk Assembly* filed in the Korean Industrial Property Office on 27 Apr. 1994 and there assigned Ser. No. 9021/1994.

BACKGROUND OF THE INVENTION

The present invention relates to an apparatus for reducing the likelihood of damage to a hard disk assembly due to physical shock and sudden impact, and more particularly to an apparatus fitted with elastic elements for buffering external impacts at each of the corners of the hard disk assembly.

Generally, a hard disk drive performs the function of recording and reproducing information stored in a magnetic memory device. Such drives typically include a spindle motor for rotating a disk upon which data is stored at a constant speed, a magnetic head for recording and reproducing the data onto and from the disk, an actuator having the magnetic head installed at one end for enabling movement of the magnetic head, and a voice coil motor for enabling the actuator to be driven.

The actuator rotates about a pivot and has a bobbin positioned at another end opposite the magnetic head. The actuator moves by a rotational force applied to the actuator via the voice coil motor, thereby enabling the magnetic head positioned at one end of the actuator to move across the surface of the disk to record and reproduce data onto and from tracks on the disk.

In a hard disk drive, in order to satisfy the need for miniaturization and low power consumption, it has been necessary to reduce the height of the hard disk assembly from a conventional height of about 42 mm, to below 1 inch. When the hard disk drive is miniaturized as described above, however, it becomes increasingly susceptible to physical damage primarily due to contact between the actuator and the surface of the disk as a result of shocks and impacts when mistreatment during shipping or handling by consumers, thereby causing the disk drives to experience an increased fault rate. Furthermore, miniaturization of the hard disk drive inherently requires that the size of the spindle motor and a bearing used in the hard disk drive be reduced. Accordingly, the hard disk drive has a very low resistance to external impacts.

To solve these problems, I have discovered that it has become necessary to provide a structure capable of buffering the hard disk assembly from damage likely to be caused by external impacts. One recent effort at creating such a structure is disclosed in U.S. Pat. No. 5,402,308 entitled *Portable Disk Storage Apparatus Using Flexible Cable For Shock Absorption* issued to Koyanagi et al. on 28 Mar. 1995. In this invention, a disk storage unit including a rotatable disk and a head actuator is supported by shock absorbers within a protective outer case. While this invention purports to provide an essentially shock-proof environment for the disk storage unit, I believe that conventional designs such as that shown in Koyanagi et al. '308 can be simplified and improved.

SUMMARY OF THE INVENTION

Accordingly, it is an object of the present invention to provide an improved apparatus for reducing shocks and impacts in a hard disk assembly.

It is another object to provide an apparatus for reducing damage to a hard disk drive that results from external impacts.

It is still another object to provide an apparatus for ensuring that no direct impact be exerted upon the hard disk assembly.

It is yet another object to provide an apparatus for buffering impacts inflicted upon the hard disk assembly.

These and other objects may be achieved with an apparatus constructed according to the principles of the present invention with an upper frame, a lower frame, slots arcuately formed in each of the corners of the upper frame and the lower frame, and elastic elements for buffering the hard disk assembly against damage due to externally administered impacts. Each one of the elastic elements has a hole formed at a center portion and is fired into the slots arcuately formed at each of the corners of the upper frame and the lower frame. A contact surface is provided at upper and lower portions of each of the corners of the hard disk assembly to further accommodate installation of the elastic elements. A fastener attaches the elastic elements, the hard disk assembly, the upper frame and the lower frame together in a unitary structure such that neither the upper frame nor the lower frame directly contacts the hard disk assembly.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
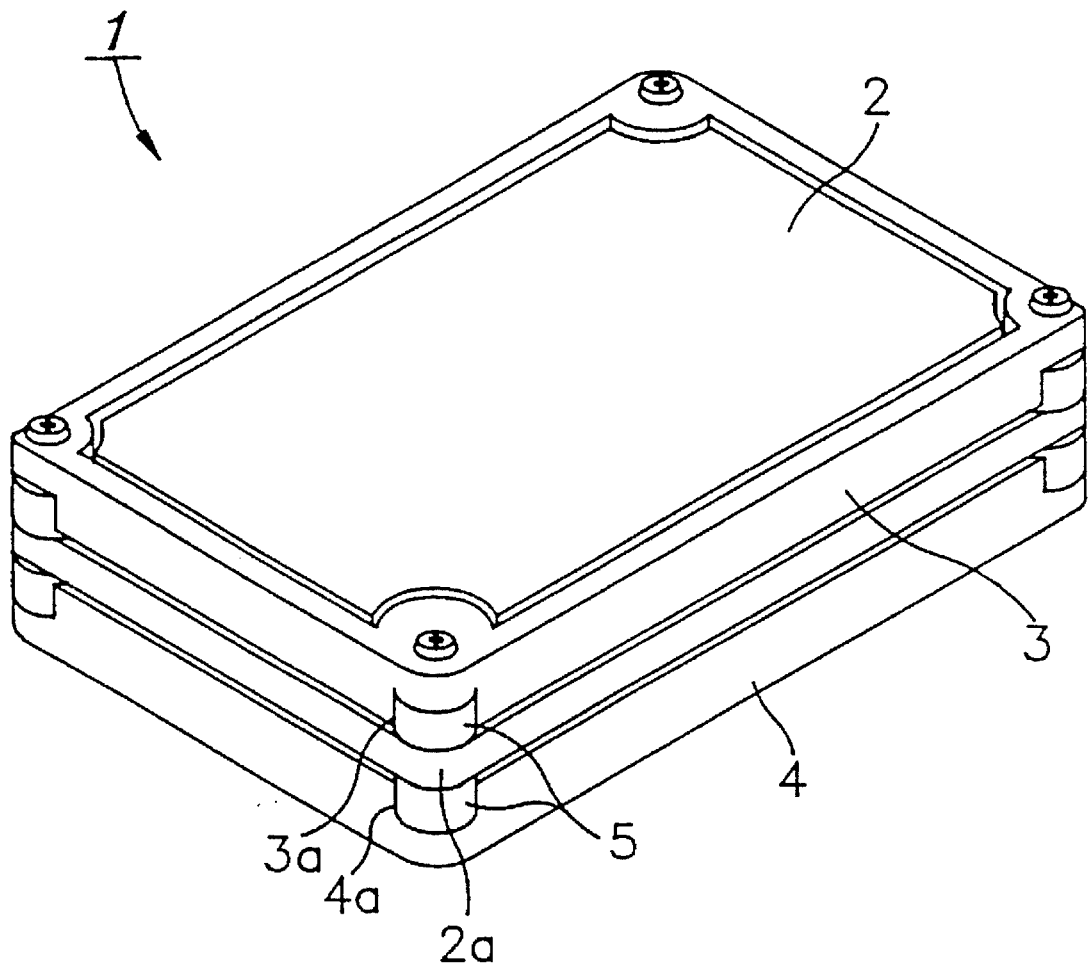
FIG. 1 is a perspective view illustrating a hard disk drive in which elastic elements for reducing impacts are installed on a hard disk assembly constructed according to the principles of the present invention.
Figure 2:
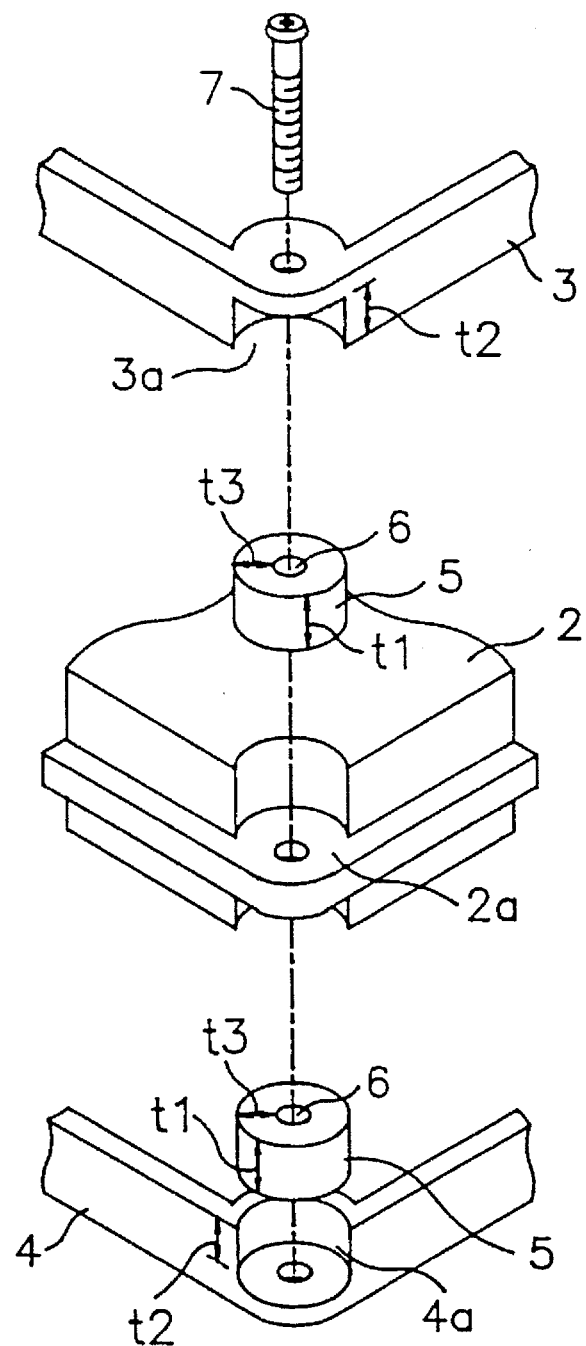
FIG. 2 is a perspective view illustrating main portions of the hard disk drive constructed according to the principles of the present invention.

Turning now to the drawings and referring to FIGS. 1 and 2, the hard disk drive 1 constructed according to the principles of the present invention will be described.

In hard disk drive 1, slots 3a and 4a are arcuately formed on the corners of an upper frame 3 and a lower frame 4, respectively. Upper frame 3 having a rectangular shape is configured for installation on an upper portion of hard disk assembly 2, while lower frame: 4 having the same rectangular shape as upper frame 3 is configured for installation on a lower portion of hard disk assembly 2. Elastic elements for buffering impacts are installed between upper frame 3 and hard disk assembly 2, and also between lower frame 4 and hard disk assembly 2. Each elastic element 5 has a height $t_1$ that is greater than a height $t_2$ of slots $3a$ and $4a$, and is provided with a hole 6 at a center portion. A contact surface $2a$ and an arcuate recess $2b$ for accommodating installation of a corresponding elastic element 5 are provided at upper and lower portions of each of the corners of the hard disk assembly 2. Each elastic element 5 is inserted into slots $3a$ and $4a$ formed at the corners of upper frame 3 and lower frame 4, respectively. At each of the corners, a screw 7 is sequentially passed through upper frame 3, hole 6 of elastic element separating upper frame 3 and hard disk assembly 2, contact surfaces $2a$ of hard disk assembly 2, hole of elastic element 5 separating lower frame 4 and hard disk assembly 2, and lower frame 4.

Each elastic element 5 has a cylindrical shape and is composed of an elastic material, such as rubber or pulpwood, which is capable of buffering impacts. The height $t_1$ of each elastic element 5 is greater than the height $t_2$ of slots $3a$ and $4a$ of upper and lower frames 3 and 4, respectively. Each elastic element 5 also has a thickness 13 that is sufficient to prevent contact between hard disk assembly 2 and upper and lower frames 3 and 4, respectively.

Operation of hard disk drive 1 constructed according to the principles of the present invention as described above will now be described in detail.

With the development of semiconductor technology, the number of integrated circuits (ICs) used in hard disk drive 1 and the size of a printed circuit substrate can be accordingly reduced. Therefore, the height of hard disk assembly 2 can be reduced to about one half of an inch in cases where the printed circuit substrate is installed in hard disk assembly 2. In the present invention, elastic elements 5 are installed at contact surfaces $2a$ formed on upper and lower portions of the corners of hard disk assembly 2 and are inserted into slots $3a$ and $4a$ formed respectively at the corners of upper frame 3 and lower frame 4. Once upper and lower frames 3 and 4, elastic elements 5 and hard disk assembly 2 are properly aligned, screw 7 is at each one of the corners sequentially passed through a fixing hole in upper frame 3, hole 6 of elastic element 5 installed between upper frame 3 and hard disk assembly 2, contact surfaces $2a$ of hard disk assembly 2, and hole 6 of elastic element 5 installed between lower frame 4 and hard disk assembly 2, thereby enabling screw 7 to be fixedly secured to lower frame 4. Since upper frame 3 and lower frame 4 cover upper and lower peripheral surfaces of hard disk assembly 2, respectively, with no direct contact between each other and hard disk assembly 2, external impacts are effectively absorbed by elastic elements 5 installed at contact surfaces $2a$ formed on the upper and lower portions of the corners of hard disk assembly 2, even though the impacts are transmitted directly to upper frame 3 and/or lower frame 4. Accordingly, hard disk assembly 2 is advantageously protected from external impacts.

Figure 3:
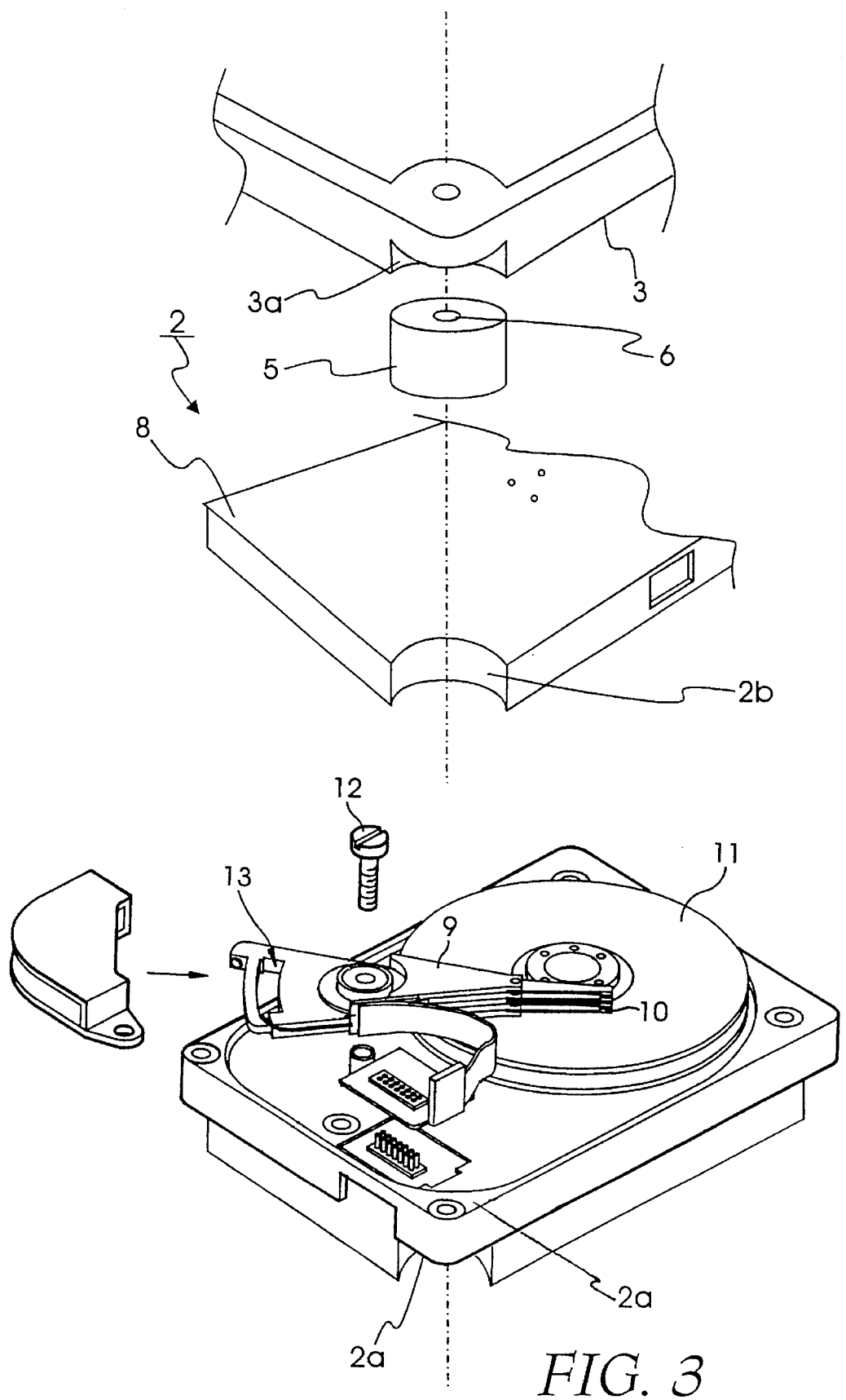
FIG. 3 is an exploded perspective view illustrating a hard disk assembly constructed according to the principles of the present invention.

Referring now to FIG. 3, an exploded perspective view illustrating the connection between hard disk assembly 2, elastic element 5 and upper frame 3 constructed according to the principles of the present invention is shown. Slot $3a$ of upper frame 3 accommodates installation of elastic element 5 in a manner such that there is alignment between hole 6 of elastic element 5 and a hole (an unnumbered feature) formed in upper frame 3. Hard disk assembly 2 has a cover 8 for enclosing and protecting the internal components of hard disk assembly 2. These internal components include an actuator arm 9 having a magnetic head 10 formed at one end portion of actuator arm 9 for recording and reproducing data onto and from tracks formed on a memory disk 11. Actuator arm 9 is secured to a base portion of hard disk assembly 2 via a fastener 12 to enable rotation of actuator arm 4 and movement of magnetic head 10 across the surface of disk 11. Rotation of actuator arm 4 is activated through a voice coil motor 13 installed at the other end portion of actuator arm 4. In essence, FIG. 3 shows those elements which are housed within hard disk assembly 2, and are highly susceptible to, damage if an external impact is applied directly to the assembly. With the present invention, however, when hard disk drive 1 constructed as described above falls or is dropped by an individual, impact transmitted to hard disk assembly 2 is attenuated since upper frame 3 and/or lower frame 4 first receives the direct impact. Furthermore, since the impact transmitted to upper frame 3 and/or lower frame 4 is buffered by each of the elastic elements 5 fixed at the upper and lower portions of the corners of hard disk assembly 2, impacts transmitted to voice coil motor 13, the spindle motor of disk 11, fastener 12 and actuator arm 9 installed in hard disk assembly 2 are also mitigated, thereby preventing damage to the disk 11 and the magnetic head 10 installed at actuator arm 9.

The present invention can be efficiently manufactured by forming upper and lower flames 3 and 4 with arcuate slots $3a$ and $4a$ formed within each of their respective corners and with shapes that extend co-extensively with an outer periphery of hard disk assembly 2. Hard disk assembly 2 is manufactured by forming arcuate recesses $2b$ within both upper and lower corners and contact surfaces $2a$ positioned between and separating the upper and lower corners of hard disk assembly 2. This simplifed, yet highly effective, design enables easy and quick assembly by alignment of the various components and insertion of fastener 7, as depicted in FIG. 2.

As described above, the present invention provides shock absorbing frames at upper and lower portions of a hard disk drive assembly, and elastic elements for buffering impacts are installed at the corners of the hard disk assembly. Therefore, when external impacts or shocks occur, the present invention provides an advantage in that the hard disk assembly can be protected from the impacts and the risk of damage to the magnetic head or the disk can be significantly reduced.

What is claimed is:

1. An apparatus for reducing impact upon a hard disk assembly in a hard disk drive, said apparatus comprising:

an upper frame installed at an upper portion of said hard disk assembly and a lower frame installed at a lower portion of said hard disk assembly; and a plurality of elastic elements for buffering said hard disk assembly from said impact, said elastic elements installed at corners of said upper and lower flames between said upper frame and said hard disk assembly and further between said lower frame and said hard disk assembly.

2. The apparatus of claim 1, further comprised of said upper frame and said lower frame having an identical shape.

3. The apparatus of claim 2, further comprised of said upper frame and said lower frame having a rectangular shape.

4. The apparatus of claim 1, further comprised of said upper frame comprising first slot portions arcuately formed in the corners of said upper frame for accommodating placement of said elastic elements between said upper frame and said hard disk assembly.

5. The apparatus of claim 4, further comprised of said lower frame comprising second slot portions arcuately formed in the corners of said lower frame for accommodating placement of said elastic elements between said lower frame and said hard disk assembly.

6. The apparatus of claim 5, further comprised of said plurality of elastic elements being selected from among the group comprising rubber and pulpwood.

7. The apparatus of claim 1, further comprised of said plurality of elastic elements being selected from among the group comprising rubber and pulpwood.

8. The apparatus of claim 1, further comprised of said elastic elements preventing contact between said upper frame and said hard disk assembly and further preventing contact between said lower frame and said hard disk assembly when said upper frame, said lower frame and said hard disk assembly are assembled into a unitary structure.

9. An apparatus for reducing impact upon a hard disk assembly in a hard disk drive, said apparatus comprising:

an upper frame;

a lower frame;

slots arcuately formed at corners of said upper frame and said lower frame;

elastic elements for buffering the impacts, each one of said elastic elements having a hole formed at a center portion, said elastic elements being positioned within said slots arcuately formed at said corners of said upper frame and said lower frame;

recesses arcuately formed at corners of said hard disk assembly for accommodating installation of said elastic elements at upper and lower portions of said corners of said hard disk assembly; and fastening means for attaching said elastic elements, said hard disk assembly, said lower frame and said upper frame together into a unitary structure so that said hard disk assembly has no direct contact with said upper frame and said lower frame.

10. The apparatus of claim 9, further comprising:

said upper frame having a rectangular shape and being installed around an upper peripheral surface of said hard disk assembly;

said lower frame having said rectangular shape and being installed around a lower peripheral surface of said hard disk assembly; and said upper and lower frames respectively covering said upper and lower portions of said corners of said hard disk assembly with no direct contact between said upper frame and said lower frame.

11. The apparatus of claim 9, further comprised of said elastic elements being selected from among the group comprising rubber and pulpwood.

12. The apparatus of claim 9, further comprised of said unitary structure being configured so that said corners of said hard disk assembly are aligned with said corners of said upper and lower frames.

13. A method of manufacturing an apparatus for reducing impact upon a hard disk assembly, comprising the steps of:

forming a lower frame comprising first arcuate recesses formed within corners of said lower frame, said lower frame having a shape that extends co-extensively with an outer periphery of said hard disk assembly;

forming an upper frame comprising second arcuate recesses formed within corners of said upper frame, said upper frame having said shape that extends co-extensively with said outer periphery of said hard disk assembly; and forming said hard disk assembly comprising third arcuate recesses formed within upper corners of said hard disk assembly and fourth arcuate recesses formed within lower corners of said hard disk assembly, said hard disk assembly further comprising a contact surface positioned between and separating said third and fourth arcuate recesses.

14. A method of assembling said apparatus of claim 13, comprising the steps of:

inserting first elastic elements into said first arcuate recesses formed within said corners of said lower frame;

placing said hard disk assembly upon said first elastic elements with said corners of said hard disk assembly in alignment with said corners of said lower frame, said first elastic elements being positioned within said fourth arcuate recesses formed within said lower corners of said hard disk assembly;

placing second elastic elements upon an upper portion of said contact surface of said hard disk assembly, said second elastic elements positioned within said third arcuate recesses formed within said upper corners of said hard disk assembly; and placing said upper frame upon said second elastic elements with said second elastic elements positioned within said second arcuate recesses of said upper frame, said corners of said upper frame being in alignment with said corners of said hard disk assembly.

15. The method for assembling said apparatus of claim 14, further comprising a step of:

inserting fastening members sequentially through said corners of said upper frame, said second elastic elements, said contact surfaces of said hard disk assembly, said first elastic elements and said corners of said lower frame to assemble said lower frame, said first elastic elements, said hard disk assembly, said second elastic elements and said upper frame as a unitary structure.

16. The method for assembling said apparatus of claim 15, further comprised of said lower frame, said first elastic elements, said hard disk assembly, said second elastic elements and said upper frame being assembled as said unitary structure without any contact between said upper frame and said hard disk assembly and between said lower frame and said hard disk assembly.

* * * * *